United States Patent
Berger et al.

(10) Patent No.: US 7,582,368 B2
(45) Date of Patent: *Sep. 1, 2009

(54) PERPENDICULAR MAGNETIC RECORDING MEDIUM WITH AN EXCHANGE-SPRING RECORDING STRUCTURE AND A LATERAL COUPLING LAYER FOR INCREASING INTERGRANULAR EXCHANGE COUPLING

(75) Inventors: Andreas Klaus Berger, San Jose, CA (US); Hoa Van Do, Fremont, CA (US); Byron Hassberg Lengsfield, III, Gilroy, CA (US); Natacha F. Supper, Campbell, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 348 days.

This patent is subject to a terminal disclaimer.

(21) Appl. No.: 11/532,055

(22) Filed: Sep. 14, 2006

(65) Prior Publication Data
US 2008/0070065 A1    Mar. 20, 2008

(51) Int. Cl.
*G11B 5/66* (2006.01)
(52) U.S. Cl. .................. 428/827; 428/828.1; 428/831.2; 428/832; 428/829; 360/135
(58) Field of Classification Search .............. 428/828.1
See application file for complete search history.

(56) References Cited

U.S. PATENT DOCUMENTS 6,834,026 B2  12/2004  Fullerton et al.

| 2003/0162041 | A1* | 8/2003 | Nemoto et al. ............... 428/469 |
| 2003/0219627 | A1* | 11/2003 | Osaka et al. ............ 428/694 R |
| 2004/0110034 | A1* | 6/2004 | Kawada ................... 428/694 R |
| 2006/0204791 | A1* | 9/2006 | Sakawaki et al. ......... 428/828.1 |
| 2006/0246323 | A1* | 11/2006 | Liu et al. ..................... 428/829 |
| 2007/0292720 | A1* | 12/2007 | Suess ...................... 428/828.1 |

OTHER PUBLICATIONS

Benakli et al., "Micromagnetic Study of Switching Speed in Perpendicular Recording Media", IEEE Trans. MAG 37, 1564 (2001).

(Continued)

*Primary Examiner*—Jennifer McNeil
*Assistant Examiner*—Vera Katz
(74) *Attorney, Agent, or Firm*—Thomas R. Berthold

(57) ABSTRACT

A perpendicular magnetic recording system and medium has a multilayered recording layer that includes an exchange-spring structure and a ferromagnetic lateral coupling layer (LCL). The exchange-spring structure is made up of two ferromagnetically exchange-coupled magnetic layers (MAG1 and MAG2), each with perpendicular magnetic anisotropy. MAG1 and MAG2 are either in direct contact with one another or have a coupling layer (CL) located between them. The LCL is located in direct contact with MAG2 and mediates intergranular exchange coupling in MAG2. The ferromagnetic alloy in the LCL has significantly greater intergranular exchange coupling than the ferromagnetic alloy in MAG2, which typically will include segregants such as oxides. The LCL is preferably free of oxides or other segregants, which would tend to reduce intergranular exchange coupling in the LCL. Because the LCL grain boundaries overlay the boundaries of the generally segregated and decoupled grains of MAG2, and the LCL and MAG2 grains are strongly coupled perpendicularly, the LCL introduces an effective intergranular exchange coupling in the MAG2.

12 Claims, 7 Drawing Sheets

OTHER PUBLICATIONS

Gao et al., "Transition Jitter Estimates in Tilted and Conventional Perpendicular Recording Media at 1 Tb/in2", IEEE Trans. MAG 39, 704 (2003).

Victoria et al., "Composite Media for Perpendicular Magnetic Recording", IEEE Trans MAG 41(2), 537-542, Feb 2005.

Wang et al., "Composite media (dynamic tilted media) for magnetic recording", Appl. Phys. Lett. 86 (14) Art. No. 142504, Apr. 4, 2005.

Choe et al., "Perpendicular Recording CoPtCrO Composite Media With Performance Enhancement Capping Layer", IEEE Transactions on Magnetics, vol. 41, No. 10, Oct. 2005, pp. 3172-3174.

Suess et al., "Optimization of Exchange Spring Perpendicular Recording Media", IEEE Transactions on Magnetics, vol. 41, No. 10, Oct. 2005, pp. 3166-3168.

Sonobe et al., Thermally stable CGC perpendicular recording media with Pt-rich CoPtCr and thin Pt layers, IEEE Transactions on Magnetics, vol. 36, No. 5, Sep. 2002, pp. 2006-2011.

* cited by examiner

PERPENDICULAR MAGNETIC RECORDING MEDIUM WITH AN EXCHANGE-SPRING RECORDING STRUCTURE AND A LATERAL COUPLING LAYER FOR INCREASING INTERGRANULAR EXCHANGE COUPLING

BACKGROUND OF THE INVENTION

1. Field of the Invention

This invention relates generally to perpendicular magnetic recording media, such as perpendicular magnetic recording disks for use in magnetic recording hard disk drives, and more particularly to a perpendicular magnetic recording medium with an "exchange-spring" recording layer structure.

2. Description of the Related Art

Horizontal or longitudinal magnetic recording media, wherein the recorded bits are oriented generally parallel to the surfaces of the disk substrate and the planar recording layer, has been the conventional media used in magnetic recording hard disk drives. Perpendicular magnetic recording media, wherein the recorded bits are stored in the recording layer in a generally perpendicular or out-of-plane orientation (i.e., other than parallel to the surfaces of the disk substrate and the recording layer), provides a promising path toward ultra-high recording densities in magnetic recording hard disk drives. A common type of perpendicular magnetic recording system is one that uses a "dual-layer" medium. This type of system is shown in FIG. 1 with a single write pole type of recording head. The dual-layer medium includes a perpendicular magnetic data recording layer (RL) on a "soft" or relatively low-coercivity magnetically permeable underlayer (SUL) formed on the substrate. The RL is typically a granular ferromagnetic cobalt alloy, such as a CoPtCr alloy with a hexagonal-close-packed (hcp) crystalline structure having the c-axis oriented generally perpendicular to the RL.

The SUL serves as a flux return path for the field from the write pole to the return pole of the recording head. In FIG. 1, the RL is illustrated with perpendicularly recorded or magnetized regions, with adjacent regions having opposite magnetization directions, as represented by the arrows. The magnetic transitions between adjacent oppositely-directed magnetized regions are detectable by the read element or head as the recorded bits.

FIG. 2 is a schematic of a cross-section of a prior art perpendicular magnetic recording disk showing the write field H acting on the recording layer RL. The disk also includes the hard disk substrate that provides a generally planar surface for the subsequently deposited layers. The generally planar layers formed on the surface of the substrate also include a seed or onset layer (OL) for growth of the SUL, an exchange break layer (EBL) to break the magnetic exchange coupling between the magnetically permeable films of the SUL and the RL and to facilitate epitaxial growth of the RL, and a protective overcoat (OC). As shown in FIG. 2, the RL is located inside the gap of the "apparent" recording head (ARH), which allows for significantly higher write fields compared to longitudinal or in-plane recording. The ARH comprises the write pole (FIG. 1) which is the real write head (RWH) above the disk, and a secondary write pole (SWP) beneath the RL. The SWP is facilitated by the SUL, which is decoupled from the RL by the EBL and produces a magnetic image of the RWH during the write process. This effectively brings the RL into the gap of the ARH and allows for a large write field H inside the RL. However, this geometry also results in the write field H inside the RL being oriented nearly normal to the surface of the substrate and the surface of the RL, i.e., along the perpendicular easy axis of the RL grains, as shown by typical grain 1 with easy axis 2. The nearly parallel alignment of the write field H and the RL easy axis has the disadvantage that relatively high write fields are necessary to reverse the magnetization because minimal torque is exerted onto the grain magnetization. Also, a write-field/easy-axis alignment increases the magnetization reversal time of the RL grains, as described by M. Benakli et al., *IEEE Trans. MAG* 37, 1564 (2001).

For these reasons, "tilted" media have been theoretically proposed, as described by K.-Z. Gao et al., *IEEE Trans. MAG* 39, 704 (2003), in which the magnetic easy axis of the RL is tilted at an angle of up to about 45 degrees with respect to the surface normal, so that magnetization reversal can be accomplished with a lower write field and without an increase in the reversal time. However, there is no known fabrication process to make a high-quality recording medium with a RL having a tilted easy axis.

A perpendicular recording medium that emulates a tilted medium and is compatible with conventional fabrication processes has been proposed. This type of medium uses an "exchange-spring" structure in the RL to achieve a magnetic behavior that emulates the behavior of a tilted medium. In an exchange-spring perpendicular recording medium, the RL structure is a composite of a magnetically "hard" layer (higher coercivity) and a magnetically "soft" layer (lower coercivity) that are ferromagnetically exchange-coupled. An intermediate coupling layer may be located between the hard and soft magnetic layers to reduce the strength of the interlayer exchange coupling. The two magnetic layers typically have different anisotropy fields ($H_k$). (The anisotropy field $H_k$ of a ferromagnetic layer with uniaxial magnetic anisotropy $K_u$ is the magnetic field that would need to be applied along the easy axis to switch the magnetization direction.) In the presence of a uniform write field H the magnetization of the lower-$H_k$ layer will rotate first and assist in the reversal of the magnetization of the higher-$H_k$ layer, a behavior that is sometimes called the "exchange-spring" behavior. Exchange-spring perpendicular recording media are described by R. H. Victora et al., "Composite Media for Perpendicular Magnetic Recording", *IEEE Trans MAG* 41 (2), 537-542, February 2005; and J. P. Wang et al., "Composite media (dynamic tilted media) for magnetic recording", *Appl. Phys. Lett.* 86 (14) Art. No. 142504, Apr. 4, 2005. Pending application Ser. No. 11/231,516, filed Sep. 21, 2005 and assigned to the same assignee as this application, describes a perpendicular magnetic recording medium with an exchange-spring RL structure formed of a lower high-$H_k$ ferromagnetic layer, an upper low-$H_k$ ferromagnetic layer and an intermediate coupling layer between the two ferromagnetic layers.

The problem of thermal decay exists for perpendicular recording media with conventional RLs and for media with exchange-spring RL structures. As the thickness of the RL structure decreases, the magnetic grains become more susceptible to magnetic decay, i.e., magnetized regions spontaneously lose their magnetization, resulting in loss of data. This is attributed to thermal activation of small magnetic grains (the superparamagnetic effect). The thermal stability of a magnetic grain is to a large extent determined by $K_u V$, where $K_u$ is the magnetic anisotropy constant of the layer and V is the volume of the magnetic grain. Thus a RL with a high $K_u$ is important for thermal stability. However, in a medium with an exchange-spring RL structure, one of the magnetic layers has very low $K_u$, so that this layer can not contribute to the thermal stability of the RL.

To address the problem of thermal decay in exchange-spring media, pending application Ser. No. 11/372,295, filed Mar. 9, 2006 and assigned to the same assignee as this application, describes a perpendicular recording medium with an exchange-spring RL structure formed of two ferromagnetic layers with substantially similar anisotropy fields $H_k$ that are ferromagnetically exchange-coupled by an intermediate nonmagnetic or weakly ferromagnetic coupling layer. Because the write head produces a larger magnetic field and larger field gradient at the upper portion of the RL, while the field strength decreases further inside the RL, the upper ferromagnetic layer can have a high anisotropy field. The high field and field gradient near the top of the RL, where the upper ferromagnetic layer is located, reverses the magnetization of the upper ferromagnetic layer, which then assists in the magnetization reversal of the lower ferromagnetic layer. Because both ferromagnetic layers in this exchange-spring type RL have a high anisotropy field and are sufficiently exchange coupled, the thermal stability of the medium is not compromised.

Both horizontal and perpendicular magnetic recording media that use recording layers of granular ferromagnetic cobalt alloys exhibit increasing intrinsic media noise with increasing linear recording density. Media noise arises from irregularities in the recorded magnetic transitions and results in random shifts of the readback signal peaks. High media noise leads to a high bit error rate (BER). Thus to obtain higher areal recording densities it is necessary to decrease the intrinsic media noise, i.e., increase the signal-to-noise ratio (SNR), of the recording media. The granular cobalt alloys in the RL structure should thus have a well-isolated fine-grain structure to reduce intergranular exchange coupling, which is responsible for high intrinsic media noise. Enhancement of grain segregation in the cobalt alloy RL can be achieved by the addition of segregants, such as oxides of Si, Ta, Ti, Nb, Cr, V, and B. These oxides tend to precipitate to the grain boundaries, and together with the elements of the cobalt alloy, form nonmagnetic intergranular material.

However, unlike horizontal recording media, where the complete absence of intergranular exchange coupling provides the best SNR, in perpendicular recording media the best SNR is achieved at some intermediate level of intergranular exchange coupling. Also, intergranular exchange coupling improves the thermal stability of the magnetization states in the media grains. Thus in perpendicular recording media, some level of intergranular exchange coupling is advantageous.

What is needed is a perpendicular magnetic recording medium with an exchange-spring RL structure that has optimal intergranular exchange coupling to produce high SNR, and high thermal stability, as well as superior writability.

SUMMARY OF THE INVENTION

The invention is a perpendicular magnetic recording medium with a RL structure that includes an exchange-spring structure and a ferromagnetic lateral coupling layer (LCL) that mediates intergranular exchange coupling in the exchange-spring structure. The exchange-spring structure is made up of two ferromagnetically exchange-coupled magnetic layers (MAG1 and MAG2), each with perpendicular magnetic anisotropy. MAG1 and MAG2 are either in direct contact with one another or have a coupling layer (CL) located between them. The CL provides the appropriate ferromagnetic coupling strength MAG1 and MAG2. The LCL is located on top of and in contact with MAG2 or below MAG2 with MAG2 on top of and in contact with the LCL.

The LCL may be formed of Co, or ferromagnetic Co alloys, such as CoCr alloys. The Co alloys may include one or both of Pt and B. The ferromagnetic alloy in the LCL has significantly greater intergranular exchange coupling than the ferromagnetic alloy in MAG2, which typically will include segregants such as oxides. The LCL alloy should preferably not include any oxides or other segregants, which would tend to reduce intergranular exchange coupling in the LCL. Because the LCL grain boundaries overlay the boundaries of the generally segregated and decoupled grains of MAG2 with which it is in contact, and the LCL and MAG2 grains are strongly coupled perpendicularly, the LCL introduces an effective intergranular exchange coupling in the MAG2, or more precisely it enables a combined LCL+MAG2 system with a tunable level of intergranular exchange.

The invention is also a perpendicular magnetic recording system that includes the above-described medium and a magnetic recording write head.

For a fuller understanding of the nature and advantages of the present invention, reference should be made to the following detailed description taken together with the accompanying figures.

DETAILED DESCRIPTION OF THE INVENTION

Figure 1:
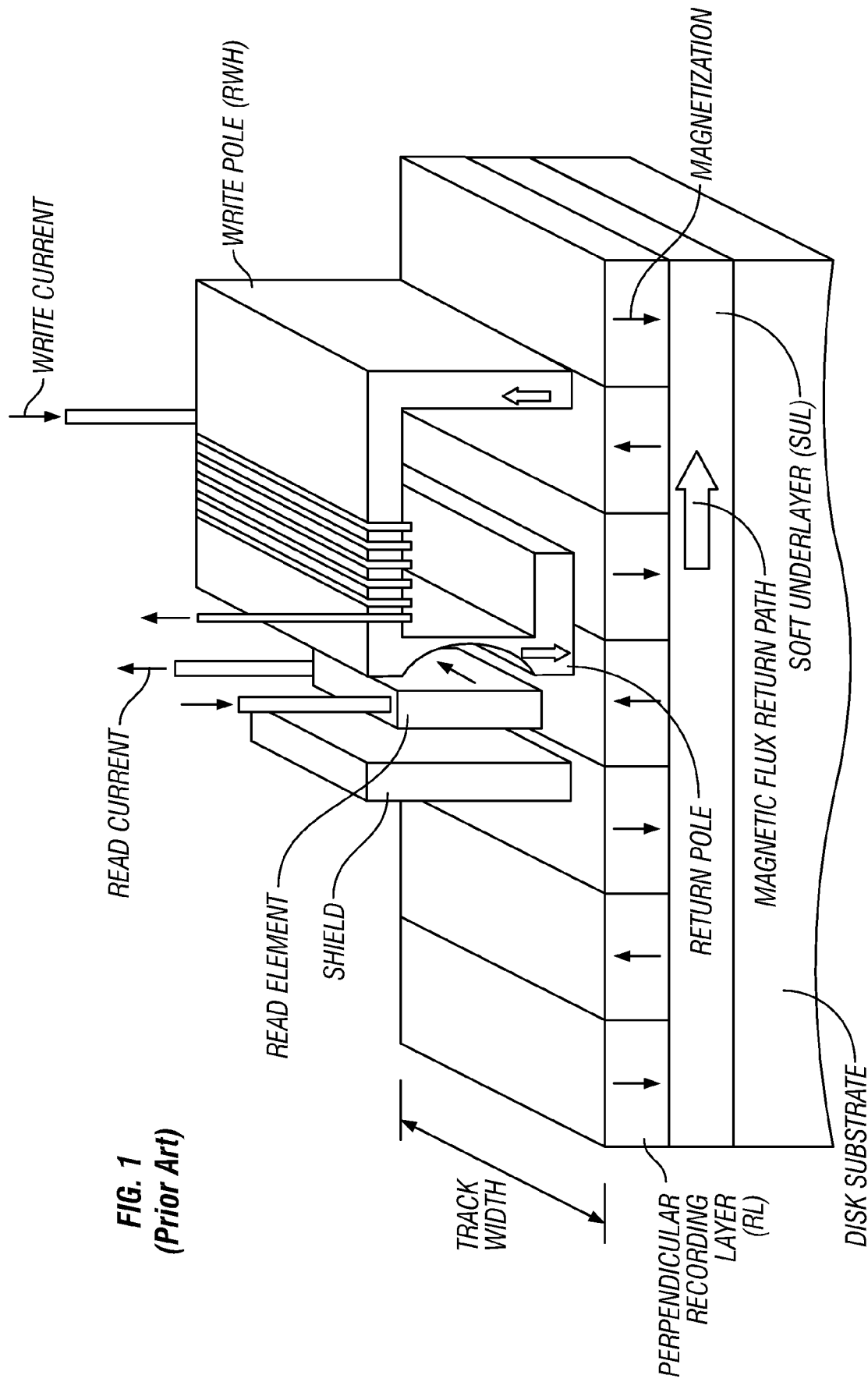
FIG. 1 is a schematic of a prior art perpendicular magnetic recording system.
Figure 2:
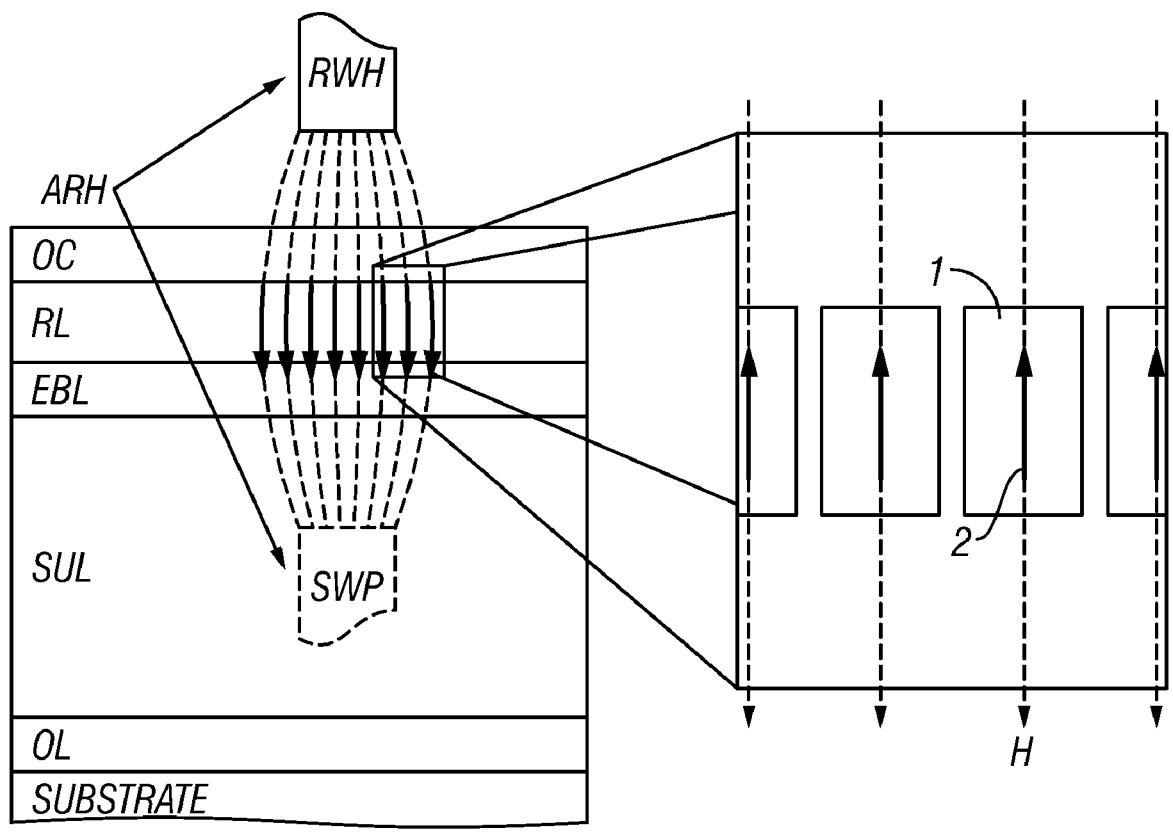
FIG. 2 is a schematic of a cross-section of a prior art perpendicular magnetic recording disk showing the write field H acting on the recording layer (RL).
Figure 3A:
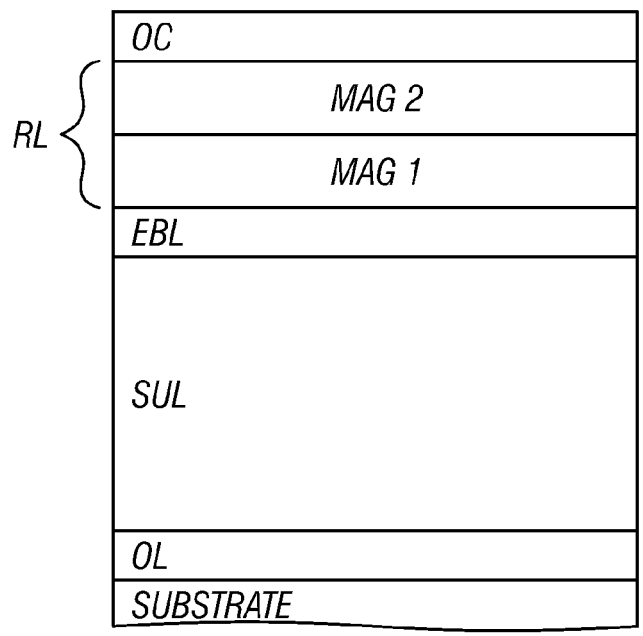
FIG. 3A is a schematic of a cross-section of a perpendicular magnetic recording disk with an exchange-spring recording layer (RL) made up of two ferromagnetically exchange-coupled magnetic layers (MAG1 and MAG2).

FIG. 3A is a schematic of a cross-section of a perpendicular magnetic recording disk according to the prior art with an exchange-spring recording layer (RL) made up of two ferromagnetically exchange-coupled magnetic layers (MAG1 and MAG2). MAG1 and MAG2 each has perpendicular magnetic anisotropy. However, MAG1 and MAG2 have different magnetic properties, so that they respond differently to the applied write field. For example, one of MAG1 and MAG2 can be magnetically soft and the other magnetically hard. The magnetic grains in the soft layer are exchange-decoupled from one another, meaning that there is very low intergranular exchange coupling in the soft layer. With a proper interlayer exchange coupling between the grains in MAG1 and MAG2, the soft grains will rotate first under the applied write field, while at the same time providing an exchange field to the hard grains to effectively tilt their easy axis, thus assisting in the magnetization reversal of the grains in the hard layer.

Figure 3B:
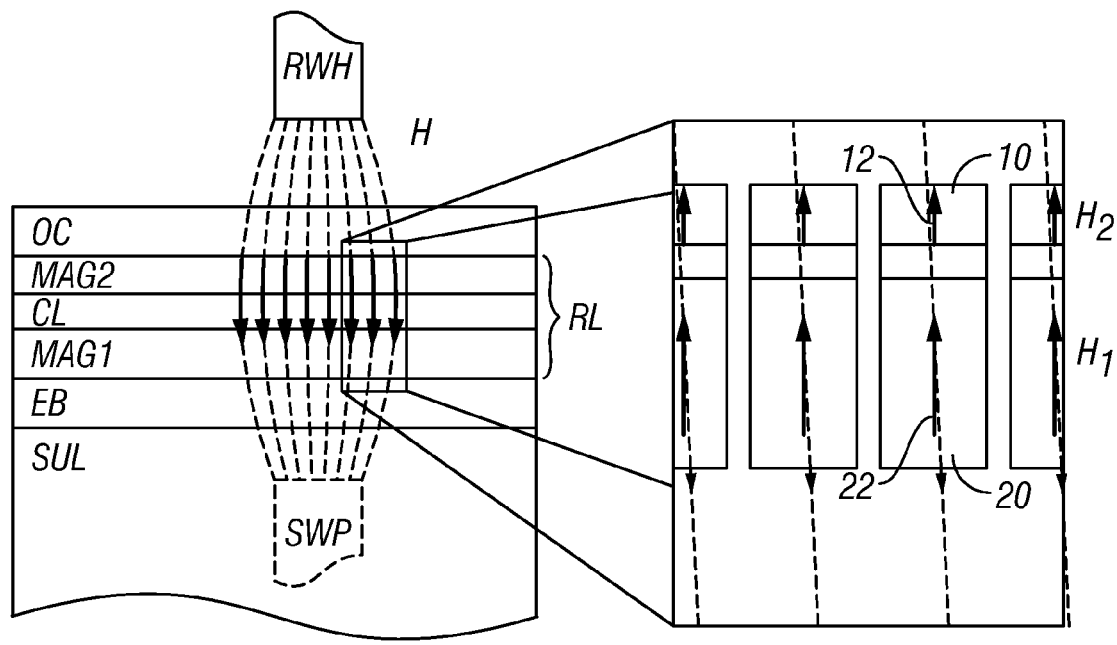
FIG. 3B is a schematic of a cross-section of a perpendicular magnetic recording disk with an exchange-spring recording layer (RL) made up of two magnetic layers (MAG1 and MAG2) separated by a ferromagnetic coupling layer (CL), and the fields H1 and H2 acting on MAG1 and MAG2, respectively.

FIG. 3B illustrates an exchange-spring medium like that described in the previously-cited pending application Ser. No. 11/372,295 wherein a coupling layer (CL) is located between MAG1 and MAG2. The composite RL has at least two ferromagnetically exchange-coupled magnetic layers (MAG1 and MAG2), each with generally perpendicular magnetic anisotropy and with substantially similar anisotropy fields $H_k$, that are separated by the CL. The CL provides the appropriate ferromagnetic coupling strength between the magnetic layers. The composite RL structure takes advantage of the depth-dependent write field H. i.e., in general a write head produces a larger magnetic field and larger field gradient near the surface of the RL, while the field strength decreases further inside the RL. The high field and field gradient near the top of the RL, where MAG2 is located, enables MAG2 to be formed of a high-$H_k$ material. As the magnetization of MAG2 is reversed by the write field it assists in the magnetization reversal of the lower magnetic layer MAG1. In this non-coherent reversal of the magnetizations of MAG1 and MAG2, MAG2 changes its magnetization orientation in response to a write field and in turn amplifies the "torque," or reverse field, exerted on MAG1, causing MAG1 to change its magnetization direction in response to a weaker write field than would otherwise be required in the absence of MAG2. Although the write field acting on MAG1 can be significantly less than the write field acting on MAG2, MAG1 can have substantially the same $H_k$ because of the torque created by the magnetization reversal of MAG2. MAG1 and MAG2 can thus have substantially the same material composition and hus substantially similar anisotropy fields Hk.

The medium in the form of a disk is shown in sectional view in FIG. 3B with the write field H. As shown in the expanded portion of FIG. 3B, a typical grain 10 in MAG2 has a generally perpendicular or out-of-plane magnetization along an easy axis 12, and is acted upon by a write field H2. A typical grain 20 in MAG1 below the MAG2 grain 10 also has a perpendicular magnetization along an easy axis 22, and is acted upon by a write field H1 less than H2. In the presence of the applied write field H2, the MAG2 acts as a write assist layer by exerting a magnetic torque onto MAG1 that assists in reversing the magnetization of MAG1.

Figure 4A:
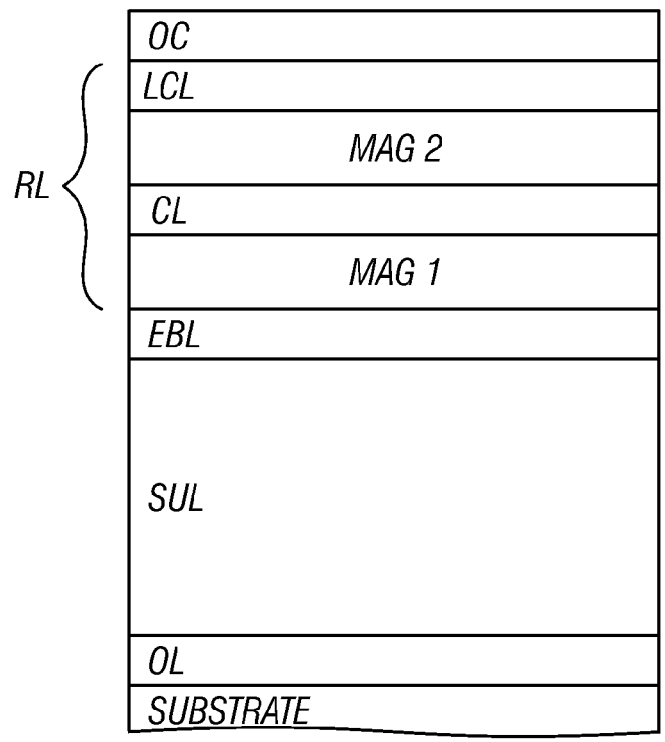
FIG. 4A is a schematic showing one implementation of the invention wherein the lateral coupling layer (LCL) is deposited directly on MAG2.
Figure 4B:
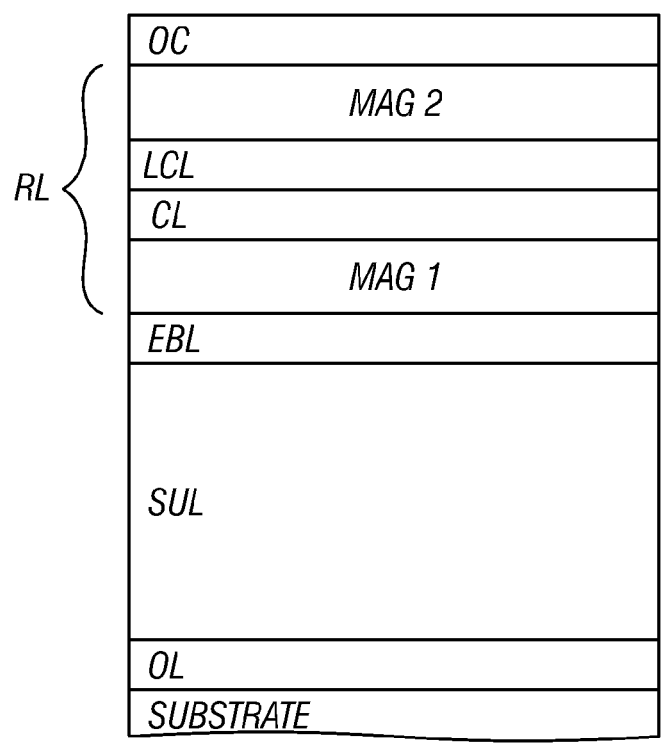
FIG. 4B is a schematic showing another implementation of the invention wherein the LCL is deposited on the CL and MAG2 is deposited directly on the LCL.

In this invention a multilayer RL structure with an additional layer in the exchange-spring RL has the improved writability of exchange-spring RLs as well as the noise reduction and thermal stability improvement found in RL structures that have an elevated level of intergranular exchange coupling. As shown in one implementation in FIG. 4A, an additional layer, called a lateral coupling layer (LCL), is located on top of and in contact with MAG2 in the exchange-spring structure. As shown in another implementation in FIG. 4B, the LCL is located below MAG2 with MAG2 on top of and in contact with the LCL. The LCL mediates the intergranular exchange coupling in the exchange-spring structure. While the LCL is depicted in FIGS. 4A and 4B as being implemented with an exchange-spring structure that includes a CL, like that shown in FIG. 3B, the LCL is also fully applicable to an exchange-spring structure without a CL, like that shown in FIG. 3A.

A representative disk structure for the invention shown in FIGS. 4A-4B will now be described. The hard disk substrate may be any commercially available glass substrate, but may also be a conventional aluminum alloy with a NiP surface coating, or an alternative substrate, such as silicon, canasite or silicon-carbide.

The adhesion layer or OL for the growth of the SUL may be an AlTi alloy or a similar material with a thickness of about 2-5 nm. The SUL may be formed of magnetically permeable materials such as alloys of CoNiFe, FeCoB, CoCuFe, NiFe, FeAlSi, FeTaN, FeN, FeTaC, CoTaZr, CoFeTaZr, CoFeB, and CoZrNb. The SUL may also be a laminated or multilayered SUL formed of multiple soft magnetic films separated by nonmagnetic films, such as electrically conductive films of Al or CoCr. The SUL may also be a laminated or multilayered SUL formed of multiple soft magnetic films separated by interlayer films that mediate an antiferromagnetic coupling, such as Ru, Ir, or Cr or alloys thereof.

The EBL is located on top of the SUL. It acts to break the magnetic exchange coupling between the magnetically permeable films of the SUL and the RL and also serves to facilitate epitaxial growth of the RL. The EBL may not be necessary, but if used it can be a nonmagnetic titanium (Ti) layer; a non-electrically-conducting material such as Si, Ge and SiGe alloys; a metal such as Cr, Ru, W, Zr, Nb, Mo, V and Al; a metal alloy such as amorphous CrTi and NiP; an amorphous carbon such as $CN_x$, $CH_x$ and C; or oxides, nitrides or carbides of an element selected from the group consisting of Si, Al, Zr, Ti, and B. If an EBL is used, a seed layer may be used on top of the SUL before deposition of the EBL. For example, if Ru is used as the EBL, a 1-8 nm thick NiFe or NiW seed layer may be deposited on top of the SUL, followed by a 3-30 nm thick Ru EBL. The EBL may also be a multi-layered EBL.

The MAG1 and MAG2 layers may be formed of any of the known amorphous or crystalline materials and structures that exhibit perpendicular magnetic anisotropy. Thus, the MAG1 and MAG2 may each be a layer of granular polycrystalline cobalt alloy, such as a CoPt or CoPtCr alloy, with a suitable segregant such as oxides of Si, Ta, Ti, Nb, Cr, V and B. Also, MAG1 and MAG2 may each be composed of multilayers with perpendicular magnetic anisotropy, such as Co/Pt, Co/Pd, Fe/Pt and Fe/Pd multilayers, containing a suitable segregant such as the materials mentioned above. In addition, perpendicular magnetic layers containing rare earth elements are useable for MAG1 and MAG2, such as CoSm, TbFe, TbFeCo, GdFe alloys. MAG1 and MAG2 may have substantially different magnetic properties, such as different anisotropy fields ($H_k$), to assure that they respond differently to the applied write field and thereby exhibit the exchange-spring behavior to improve writability. MAG1 and MAG2 may also have substantially the same anisotropy field $H_k$, meaning that the $H_k$ value for the layer with the lower $H_k$ is at least 70% (and up to at least 90%) of the $H_k$ value for the layer with the higher $H_k$, and still exhibit the exchange-spring behavior as described above for the medium shown in FIG. 3B.

The CL may be a hexagonal-close-packed (hcp) material, which can mediate a weak ferromagnetic coupling and also provide a good template for the growth of MAG2. Because the CL must enable an appropriate interlayer exchange coupling strength, it should be either nonmagnetic or weakly ferromagnetic. Thus the CL may be formed of RuCo and RuCoCr alloys with low Co content (<about 60 atomic percent), or CoCr and CoCrB alloys with high Cr and/or B content (Cr+B>about 30 atomic percent). Si-oxide or other oxides like oxides of Ta, Ti, Nb, Cr, V and B may be added to these alloys. The CL may also be formed of face-centeredcubic (fcc) materials, such as Pt or Pd or alloys based on Pt or Pd, because these materials enable a ferromagnetic coupling between magnetic layers of tunable strength (i.e., they reduce the coupling by increasing the thickness) and are compatible with media growth.

Depending on the choice of material for CL, and more particularly on the concentration of cobalt (Co) in the CL, the CL may have a thickness of less than 3.0 nm, and more preferably between about 0.2 nm and 2.5 nm. Because Co is highly magnetic, a higher concentration of Co in the CL may be offset by thickening the CL to achieve an optimal interlayer exchange coupling between MAG1 and MAG2. The interlayer exchange coupling between MAG1 and MAG2 may be optimized, in part, by adjusting the materials and thickness of the CL. The CL should provide a coupling strength sufficient to have a considerable effect on the switching field (and the switching field distribution), but small enough to not couple the MAG1 and MAG2 layers rigidly together.

Figure 5A:
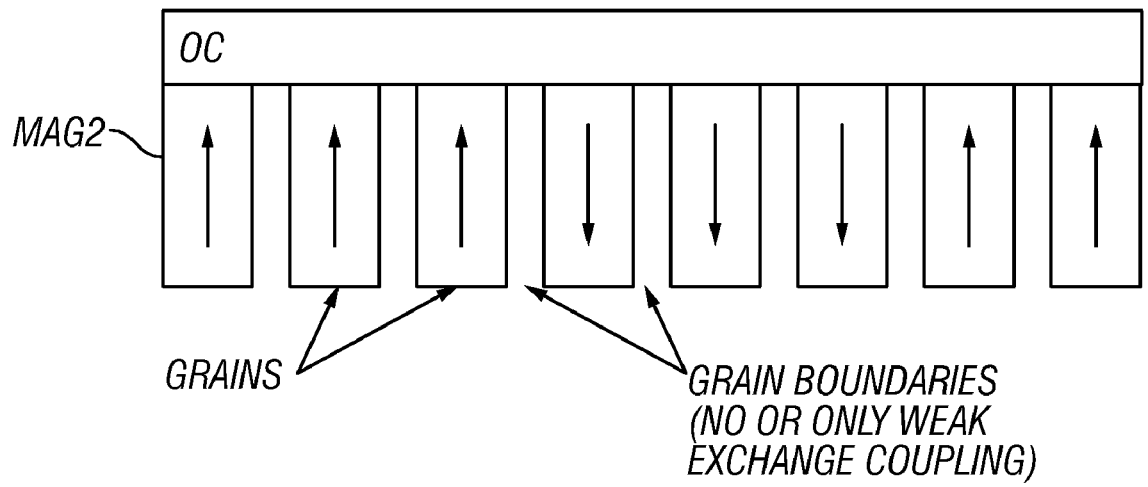
FIGS. 5A-5B illustrate schematically the grains and magnetizations in MAG2 without the LCL (FIG. 5A) and with the LCL (FIG. 5B).
Figure 5B:
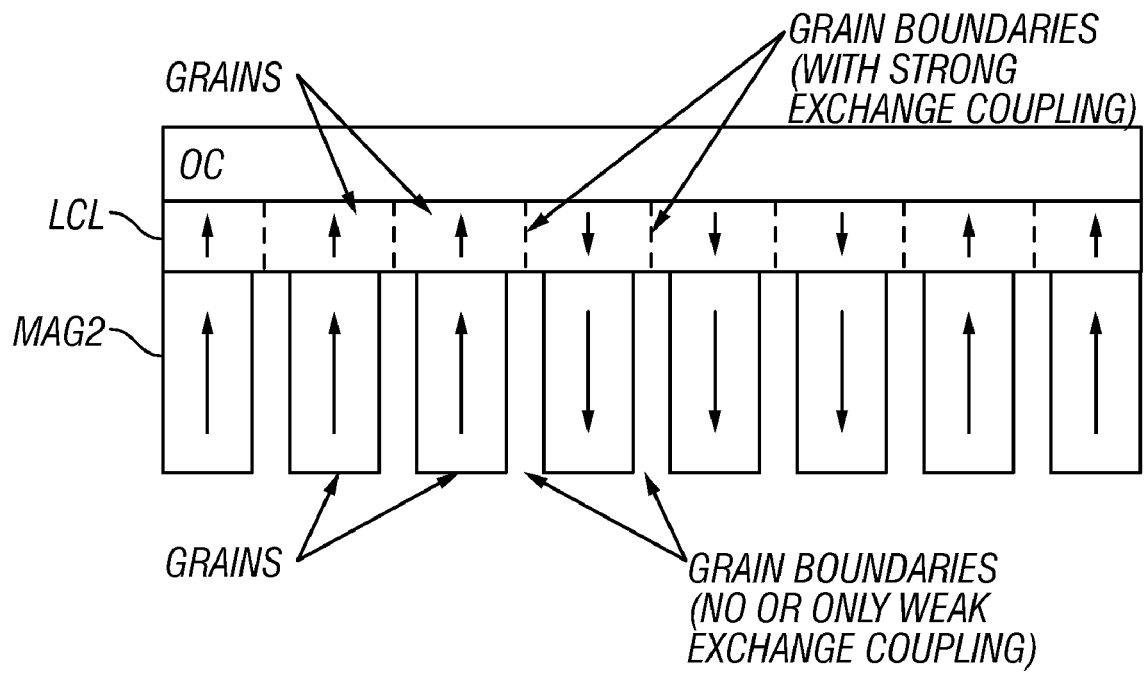

The LCL may be formed of Co, or ferromagnetic Co alloys, such as CoCr alloys. The Co alloys may include one or both of Pt and B. The LCL is deposited directly on MAG2 in the FIG. 4A implementation, or the LCL is deposited on the CL and MAG2 is deposited directly on the LCL in the FIG. 4B implementation. The ferromagnetic alloy in the LCL has significantly greater intergranular exchange coupling than the ferromagnetic alloy in MAG2. The LCL alloy should preferably not include any oxides or other segregants, which would tend to reduce intergranular exchange coupling in the LCL. Because the LCL grain boundaries overlay the boundaries of the generally segregated and decoupled grains of the MAG2 with which it is in contact, and the LCL and MAG2 grains are strongly coupled perpendicularly, the LCL introduces an effective intergranular exchange coupling in the MAG2, or more precisely it enables a combined LCL+MAG2 system with a tunable level of intergranular exchange. This is depicted in FIGS. 5A-5B, which illustrate schematically the grains and magnetizations in MAG2 without the LCL (FIG. 5A) and with the LCL (FIG. 5B). The total LCL+MAG2 thickness should be in the range of approximately 2-10 nm, preferably in the range of approximately 3-7 nm. The LCL portion of the total LCL+MAG2 thickness should be between about 10-90%, with a preferred range of about 20-60%. The optimal LCL thickness can be determined experimentally by varying the thickness and measuring the performance of the disks to determine which thickness provides the most suitable level of intergranular exchange coupling for the combined LCL+MAG2 system.

The OC formed on top of the RL may be an amorphous "diamond-like" carbon film or other known protective overcoats, such as Si-nitride.

Figure 6:
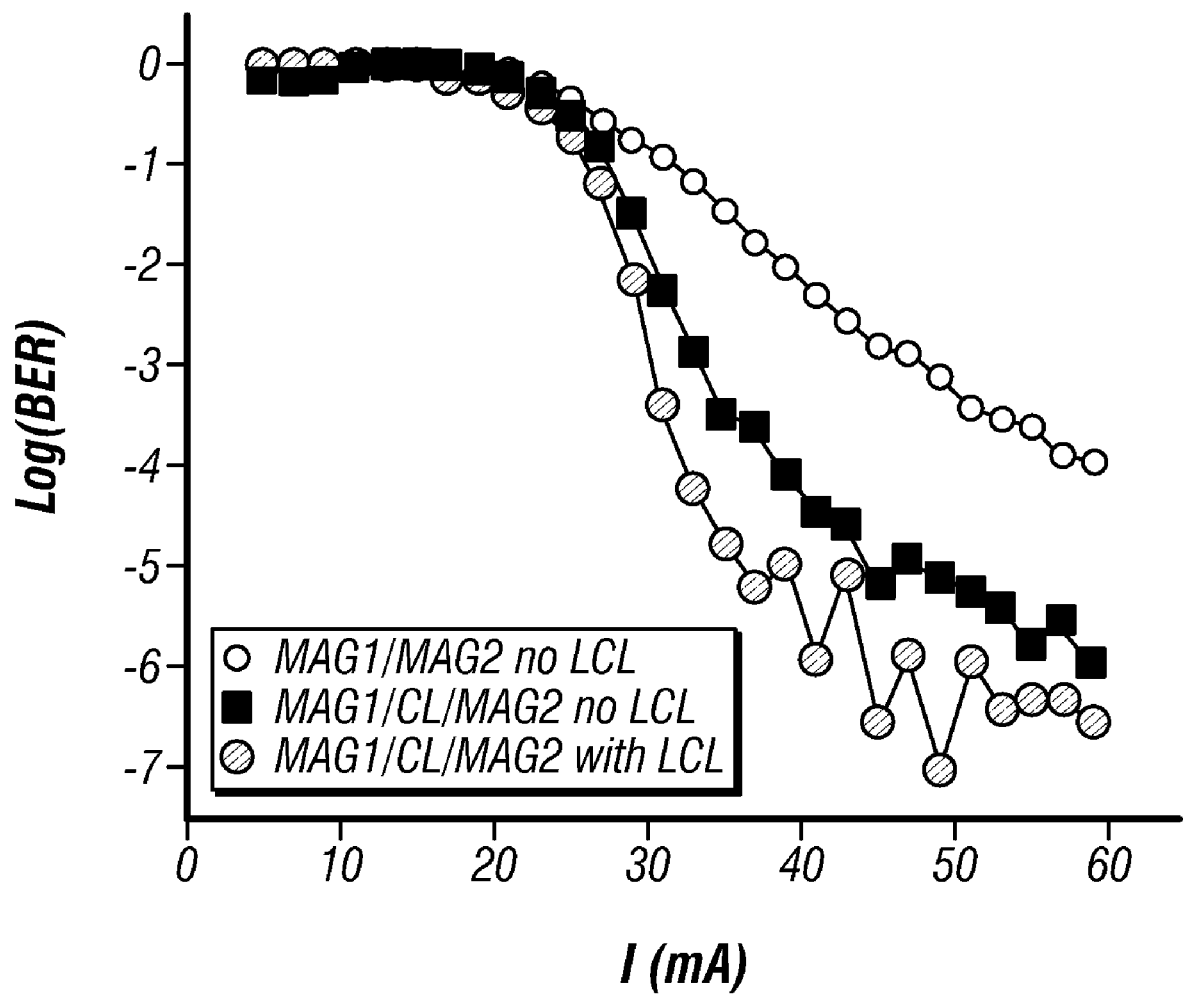
FIG. 6 is a graph of bit error rate (BER) as a function of the recording head write current for two reference structures and the structure according to this invention.

The structure according to this invention has been tested experimentally by using a MAG1/CL/MAG2 exchange spring structure of CoPtCr—Ta-oxide/RuCo/CoPtCr—Si-oxide onto which an LCL of $Co_{(1-x)}Cr_x$ (x=0.1 to 0.22) was deposited. FIG. 6 shows the recording results of BER as a function of recording head write current for several specific structures:

(a) a first reference structure MAG1/MAG2 dual MAG layer structure of CoPtCr—Ta-oxide/CoPtCrSi-oxide without the LCL;

(b) a second reference structure MAG1/CL/MAG2 exchange spring structure of CoPtCr—Ta-oxide/RuCo/CoPtCr—Si-oxide (4 nm) without the LCL; and (c) a MAG1/CL/MAG2 exchange spring structure of CoPtCr—Ta-oxide/RuCo/CoPtCr—Si-oxide (3 nm) with a LCL of $Co_{90}Cr_{10}$ (1.5 nm).

From a comparison with the reference structures, it is evident from FIG. 6 that the recording performance of the structure with the LCL is improved even beyond the recording performance of the second reference structure, which by itself is much better than the Ta-oxide/Si-oxide dual layer first reference structure. The significant error rate improvement shown in FIG. 6 was achieved for comparable signal levels and track width. Additionally, magnetic hysteresis loops of these structures revealed a significantly reduced saturation field (by approximately 10%) for the structure with the LCL at comparable nucleation fields, corroborating the higher level of intergranular exchange coupling being present in the overall structure due to the highly exchange-coupled grains in the CoCr LCL.

Figure 7B:
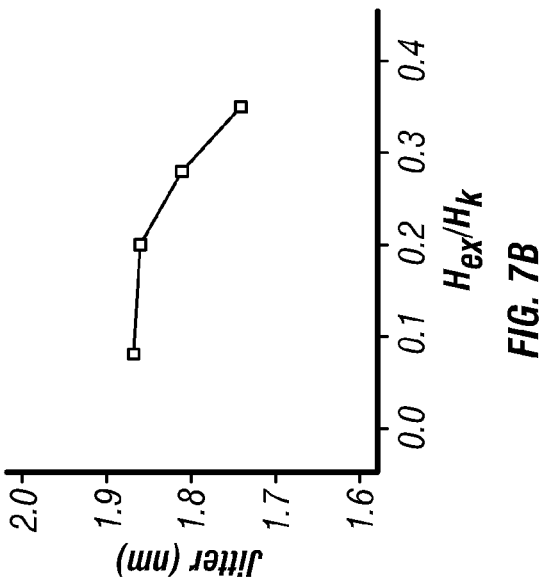
FIG. 7B is a graph of jitter as a function of intergranular exchange coupling for the modeling parameters of FIG. 7A.
Figure 7C:
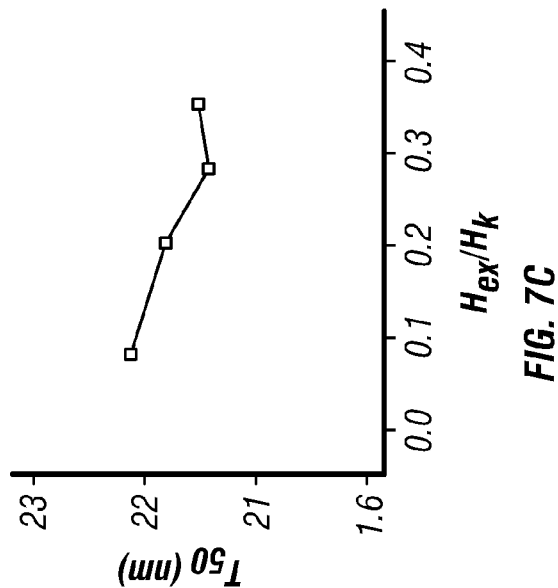
FIG. 7C is a graph of $T_{50}$ as a function of intergranular exchange coupling for the modeling parameters of FIG. 7A.
Figure 7A:
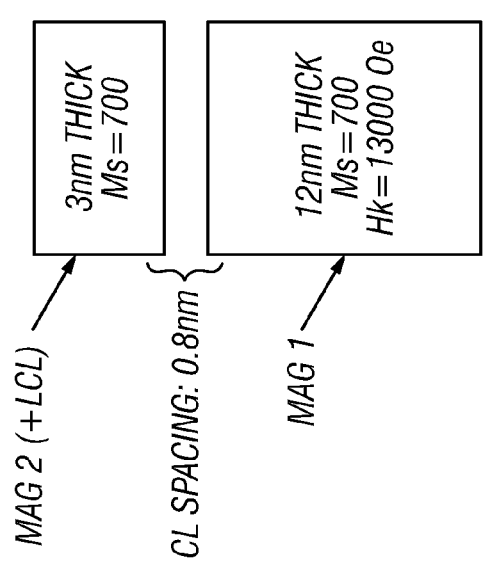
FIG. 7A is a schematic of a modeling test structure and a description of the test parameters for testing jitter and $T_{50}$ as a function of intergranular exchange coupling.

The improvements provided by the structure of this invention have also been established by a micromagnetic modeling study of the role of intergranular exchange coupling in a MAG1/CL/MAG2 exchange-spring structure. For this purpose, key recording performance parameters of jitter (which is the positioning error for bit transitions, measured as the standard deviation of the zero crossings for the readback voltage) and $T_{50}$ (which is the width of an isolated transition, measured as the distance between the +50% and the −50% points of the signal) were calculated as a function of the intergranular exchange coupling ($H_{ex}$) in MAG2, which mimics the addition of the CoCr LCLs in our experiments. A description of the structure and parameters for this study is shown in FIG. 7A, with the calculations shown in FIGS. 7B-7C. In FIG. 7A, Dc is the average grain diameter used in the modeling. FIG. 7B demonstrates that a noise reduction, due to an enhanced intergranular exchange coupling in MAG2, can be achieved. Also, FIG. 7C shows that the $T_{50}$ values can be reduced to a certain degree, further improving the overall recording performance.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording medium for use in a magnetic recording system having a write head that generates a magnetic write field to magnetize regions of the medium, the medium comprising:

a substrate;

an exchange-spring structure on the substrate and comprising:

a first ferromagnetic layer comprising a granular polycrystalline cobalt alloy and an oxide of one or more of Si, Ta, Ti, Nb, Cr, V and B and having an out-of-plane easy axis of magnetization; and a second ferromagnetic layer comprising a granular polycrystalline cobalt alloy and an oxide of one or more of Si, Ta, Ti, Nb, Cr, V and B and having an out-of-plane easy axis of magnetization and an anisotropy field equal to or greater than 70 percent and less than or equal to 90 percent of the anisotropy field of the first ferromagnetic layer, the first ferromagnetic layer being located between the substrate and the second ferromagnetic layer;

a coupling layer (CL) between the first ferromagnetic layer and the second ferromagnetic layer and permitting ferromagnetic exchange coupling of the first ferromagnetic layer with the second ferromagnetic layer, whereby in the presence of a magnetic write field the magnetization in a region of the second ferromagnetic layer reverses first and assists in the magnetization reversal in a region of the first ferromagnetic layer; and a ferromagnetic lateral coupling layer (LCL) between the CL and the second ferromagnetic layer and in contact with the CL and the second ferromagnetic layer, the LCL comprising a granular material having intergranular exchange coupling greater than the intergranular exchange coupling of the second ferromagnetic layer with which it is in contact.

2. The medium of claim 1 wherein the LCL is selected from the group consisting of Co and a ferromagnetic Co alloy.

3. The medium of claim 2 wherein the LCL is a ferromagnetic Co alloy comprising Cr and an element selected from the group consisting of B and Pt.

4. The medium of claim 2 wherein the LCL is a ferromagnetic alloy consisting essentially of only Co and Cr.

5. The medium of claim 1 wherein the CL is formed of a material selected from the group consisting of (a) a RuCo alloy with Co less than about 60 atomic percent, (b) a RuCoCr alloy with Co less than about 60 atomic percent, and (c) an alloy of Co and one or more of Cr and B with the combined content of Cr and B greater than about 30 atomic percent.

6. The medium of claim 1 further comprising an underlayer of magnetically permeable material on the substrate and an exchange break layer between the underlayer and the first ferromagnetic layer for preventing magnetic exchange coupling between the underlayer and the first ferromagnetic layer.

7. A perpendicular magnetic recording disk for use in a magnetic recording disk drive having a write head that generates a magnetic write field to magnetize regions of the disk, the disk comprising:

a substrate having a generally planar surface;

an underlayer of magnetically permeable material on the substrate surface;

an exchange-spring structure on the underlayer and comprising first and second exchange-coupled ferromagnetic layers, the first ferromagnetic layer being located between the underlayer and the second ferromagnetic layer, the second ferromagnetic layer having an anisotropy field equal to or greater than 70 percent and less than or equal to 90 percent of the anisotropy field of the first ferromagnetic layer, whereby in the presence of a magnetic write field the magnetization in a region of the second ferromagnetic layer reverses first and assists in the magnetization reversal in a region of the first ferromagnetic layer, each of said first and second layers having an out-of-plane easy axis of magnetization and comprising a granular polycrystalline cobalt alloy and an oxide of one or more of Si, Ta, Ti, Nb, Cr, V and B; and a ferromagnetic lateral coupling layer (LCL) comprising an oxide-free ferromagnetic alloy comprising Co and Cr, the second ferromagnetic layer being located between the first ferromagnetic layer and the LCL and the LCL being in contact with the second ferromagnetic layer.

8. The disk of claim 7 wherein the LCL alloy includes an element selected from the group consisting of B and Pt.

9. The disk of claim 7 further comprising a coupling layer (CL) between the first ferromagnetic layer and the second ferromagnetic layer and permitting ferromagnetic exchange coupling of the first ferromagnetic layer with the second ferromagnetic layer.

10. The disk of claim 9 wherein the CL is formed of a material selected from the group consisting of (a) a RuCo alloy with Co less than about 60 atomic percent, (b) a RuCoCr alloy with Co less than about 60 atomic percent, and (c) an alloy of Co and one or more of Cr and B with the combined content of Cr and B greater than about 30 atomic percent, (d) Pt, (e) Pd, (I) Pt-based alloys, and (g) Pd-based alloys.

11. The disk of claim 7 further comprising an exchange break layer between the underlayer and the first ferromagnetic layer for preventing magnetic exchange coupling between the underlayer and the first ferromagnetic layer.

12. A perpendicular magnetic recording system comprising:

the disk of claim 7;

a write head for magnetizing regions in the LCL, the second ferromagnetic layer in contact with the LCL, and the ferromagnetically exchange-coupled first ferromagnetic layer of said disk; and a read head for detecting the transitions between said magnetized regions.

* * * * *